Sept. 8, 1936. R. MacEACHEN 2,053,294
ANKLE TREAD TRACTOR
Original Filed Nov. 2, 1934 4 Sheets-Sheet 3

Inventor:
Roderick MacEachen
by Lester L. Sargent
Atty.

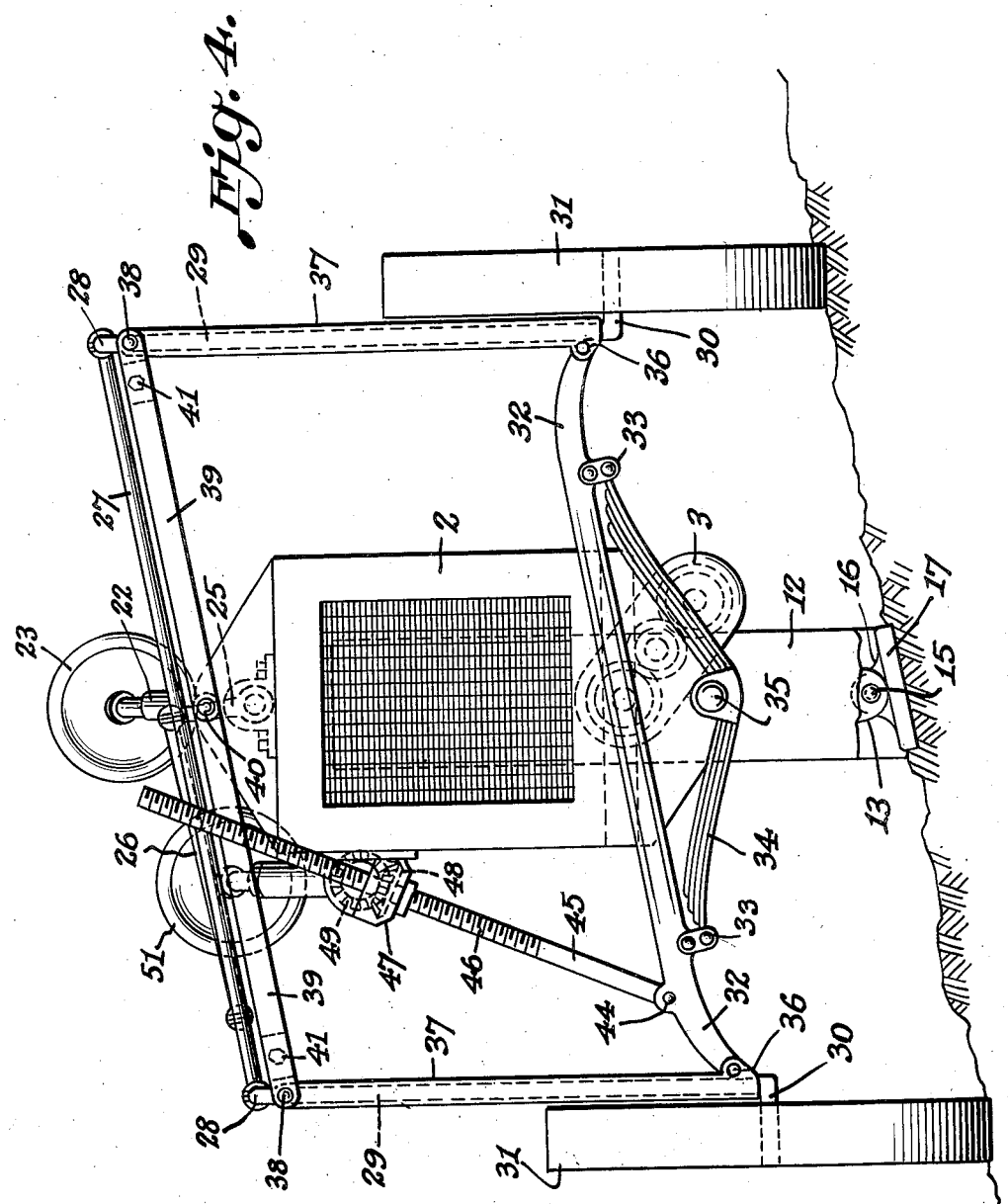

Patented Sept. 8, 1936

2,053,294

UNITED STATES PATENT OFFICE 2,053,294

ANKLE-TREAD TRACTOR

Roderick MacEachen, Morgantown, W. Va.

Application November 2, 1934, Serial No. 751,217
Renewed May 29, 1936

7 Claims. (Cl. 180—25)

The object of my invention is an ankle-tread tractor of novel construction which will provide more efficient power traction for farms and for other uses, and which has mechanisms so designed as to complete road contact under all conditions; to provide a tractor of this type having a single traction or driving wheel fitted with sectional tread pivotally mounted for operation on uneven roadways or hillsides. It is a further object of my invention to provide a tractor of novel design in which the center of gravity may be shifted under the control of the operator when it is being operated along hillsides, so as to keep the body of the machine in a perpendicular position and thus add safety and efficiency to the operation of the tractor. It is also an object of my invention to provide a tractor of simple mechanical constructions having the novel arrangement and combination of mechanisms hereinafter described and illustrated in the accompanying drawings, in which—

Fig. 4 is a front elevation showing the tractor adjusted to an inclined plane.

Like numerals designate like parts in each of the several views:

Figure 1:
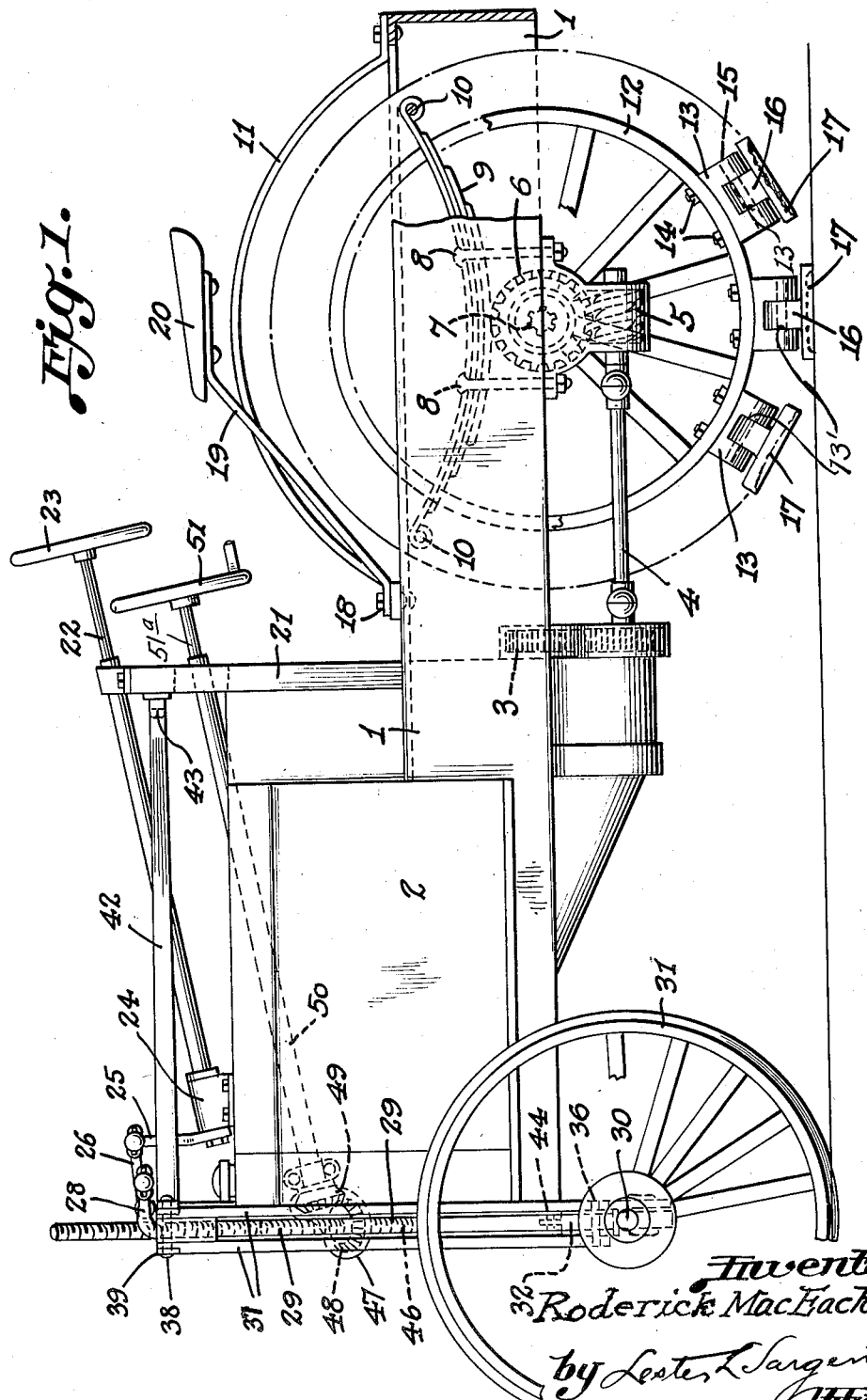
Figure 1 is a side elevation of my tractor.

Referring to the drawings, there is illustrated a chassis or frame 1, carrying a motor and motor covering 2, transmission 3, horizontal shaft 4, carrying a worm 5, which meshes with worm gear 6 on shaft 7. Shaft 7 is secured by bolts 8 to leaf springs 9, and the ends of springs 9 are hinged on frame 1 at 10, as shown in Fig. 1. I provide a driving or traction wheel 12 over which extends a suitable wheel guard 11.

Traction wheel 12 is of novel construction and is provided with projecting blocks 13 affixed to the wheel 12 by suitable means as by bolts 14, and each block has a jaw 13'. I have devised ankle tread sections 17 each of which has its traction face suitably pitted, and has a projection 16 which is seated in the jaw 13' of block 13. It is pivotally mounted thereto by means of a suitable pivot pin 15 inserted through corresponding eyes in the members 13 and 16, as shown in Figs. 1 and 4, to form a knuckle joint, and permit of free lateral flexibility of the tread sections.

Figure 3:
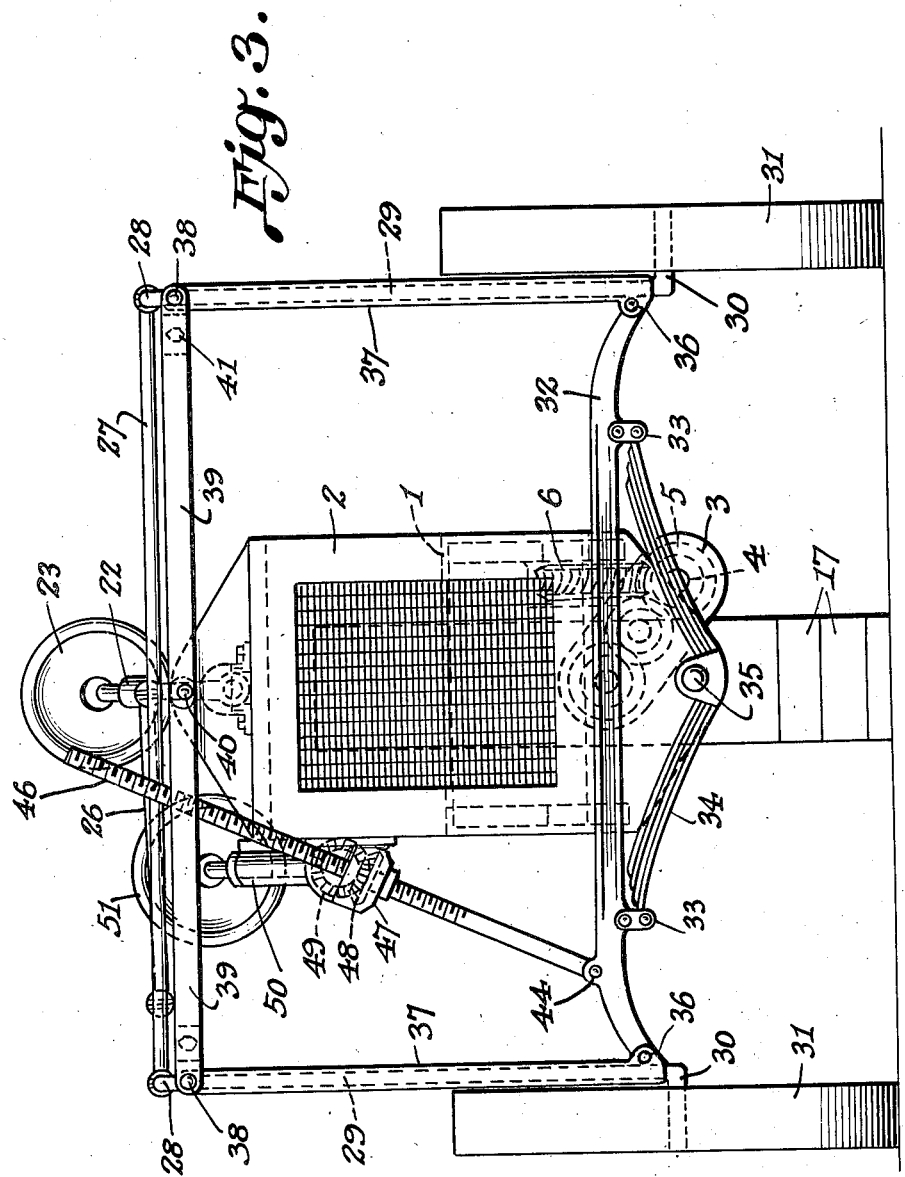
Fig. 3 is a front elevation of same with the tractor on level ground.

I provide a conventional seat 20, mounted on spring supports 19, attached to the chassis 1 by bolts 18. I provide a suitable support 21 for the steering column 22 on which is mounted a conventional steering wheel 23. The lower end of the steering column 22 is connected by steering mechanism 24 and finger or link 25 with the pull rod 26, which is operatively connected at its outer end with the cross rod 27. Cross rod 27 is pivotally connected with the rearwardly bent ends 28 of the vertical columns 29. Vertical column 29 terminates in stub axles 30 on which the front wheels 31 of the tractor are mounted. This mechanism provides means for steering the tractor. Each of the axles 30 is integral with and is an extension of the columns 29. Suspended from axle 32 are shackles 33 to the ends of which are pivotally connected a suitable leaf spring 34, and to which the frame 1 is pivotally mounted at 35, as shown in Figs. 3 and 4.

Figure 2:
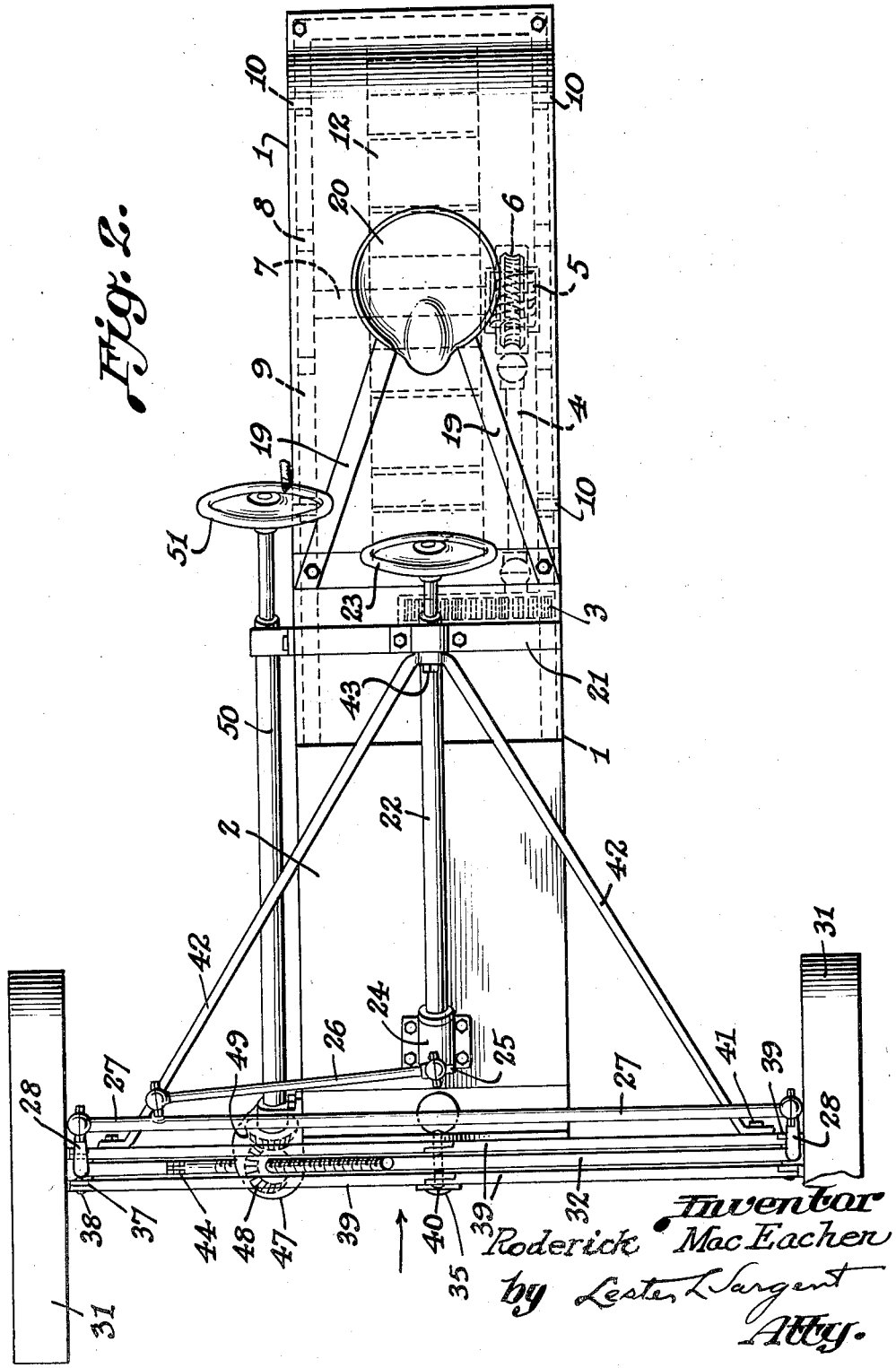
Fig. 2 is a top plan view of same.

I provide a plurality of frame rods 37 which as shown in Fig. 1 are pivotally connected at their lower ends to the axle 32, by pivoted pins 36; and also are pivotally connected at their upper ends at 38 with the transverse frame rods 39, which are pivotally connected at 40 with the motor covering 2. Radius rods 42 are secured by bolts 41 to frame rods 39, and are pivotally attached by pivot 43 with support 21, as shown in Fig. 2.

Pivotally connected at 44 to axle 32 is a rod 45, having screw threads 46. A suitable fixed gear box 47 is mounted on motor covering 2 and contains a gear 48 loosely mounted in the gear box 47. Gear 48 meshes with gear 49 on the lower end of shaft 51a mounted in the casing 50, which carries a suitable hand wheel 51.

The front wheels are mounted pivotally relative to the axle 32 which is attached pivotally to the frame of the machine which is hinged at the respective pivots 36 and 38 so as to permit the upper mechanism (which includes the tractor motor and motor covering 2 and parts affixed thereto) to be swung laterally, as shown in Fig. 4, by the rotation of hand wheel 51, shaft 51a gears 49 and 47 and screw threaded shaft 45 (or other suitable means). When the hand wheel 51, shaft 51a, and its gear 49 are rotated the shaft gear 49 actuates gear 47 which is mounted on the screw-threaded portion of shaft 45 and operates that shaft, which shaft is pivotally connected at 44 to the axle 32 to raise or lower the motor and casing relative to the axle, inasmuch as the casing 50 of shaft 51a is clamped to the motor covering and to the member 21 and as the motor itself is pivotally mounted at 35 on the spring 34 which is suspended from axle 32, and at 40 with the transverse frame rods 39, which is clearly shown in Figs. 3 and 4. As the tractor frame can be swung or held to a tilted or slanting position by operation of the shaft and gears above described when the vehicle is traveling on a side hill, as illustrated in Fig. 4, it will be obvious that the center of gravity of the entire vehicle is shifted laterally towards the raised wheel 31 so as to lessen the liability of overturning the vehicle under such conditions.

When the tractor is in use the tread sections 17 of the traction or driving wheel 12, being attached pivotally to that wheel, will flex or swing laterally in a plane at right angles to the plane of the rim of the driving wheel to any unevenness of the road or to adjust the traction surface to an inclined plane if the tractor is operating on a hillside.

What I claim is:—

1. In a three-wheel tractor, the combination of a tractor frame, a pair of front wheels, a rear driving wheel, sectional treads on the driving wheel pivotally mounted for free lateral movement in a plane at right angles to the plane of the driving wheels, means for pivotally supporting the front end of the tractor frame relative to the front wheels, and means for laterally moving the tractor frame to shift its center of gravity laterally when the tractor is operating on a hillside.

2. In a tractor of the type described, in combination, a frame, a pair of pivotally mounted front wheels, a front axle, a spring suspended from the front axle, a motor structure, means for pivotally mounting the motor structure on said spring and on the frame of the tractor, means for shifting the center of gravity of the tractor frame, said means including gear mechanism affixed to the motor structure, a rod connected to the frame, and a member carried by said rod and actuated by gear mechanism on the motor structure, the tractor having a single driving wheel, said driving wheel having pivoted tread sections capable of free lateral movement.

3. In a tractor of the type described, in combination, a frame, a pair of pivotally mounted front wheels, a front axle, a motor structure comprising a motor casing, means for pivotally suspending the aforesaid tractor frame from the front axle and frame of the tractor, means for shifting the center of gravity of the aforesaid tractor frame, said means including gear mechanism affixed to the aforesaid motor casing, a rod connected to the frame, a member carried by said rod and actuated by the gear mechanism on the motor structure, and a single driving wheel for the tractor, said driving wheel having pivoted tread sections capable of free lateral movement.

4. A three-wheel tractor having a single driving wheel, said driving wheel having a series of pivotally mounted sectional treads capable of free lateral movement, a tractor frame including a front axle, pivotally mounted front wheels, and a threaded shaft and gear mechanism affixed to the motor casing and pivotally connecting the frame with the motor structure and a control wheel geared to said threaded shaft and adapted to be operated by the driver of the tractor for adjusting the frame of the tractor to permit of laterally shifting the center of gravity of the tractor frame to adapt it to operation on a hillside.

5. A three-wheel tractor having a single rear driving wheel, said driving wheel having a series of pivotally mounted sectional treads capable of free lateral movement, a tractor frame including a front axle, pivotally mounted front wheels, and a threaded shaft and gear mechanism affixed to the motor casing and pivotally connecting the frame to the motor structure and means actuating said gear mechanism and controlled manually for adjusting the frame of the tractor to permit of laterally shifting the center of gravity of the tractor frame to adapt it to operation on a hillside, and manually operative means for controlling said tractor frame for laterally adjusting the frame of the tractor.

6. In a tractor of the type described, in combination, a tractor frame, upper mechanism including a motor structure, a pair of front wheels, a front axle, a threaded rod pivotally connected to the front axle, a gear casing affixed to the upper portion of the motor structure, a spring suspended from the front axle, means for pivotally mounting the motor structure on said spring and on the frame of the tractor, a gear loosely mounted in the above-mentioned gear casing and threaded on the aforesaid threaded rod, and manually controlled means for rotating said gear to adjust the position of the motor structure relative to the threaded rod for shifting the center of gravity of the tractor frame.

7. In a tractor of the type described, in combination, a tractor frame, upper mechanism including a motor casing, a pair of front wheels, a front axle, a threaded rod pivotally connected to the front axle, a gear casing affixed to the upper portion of the motor casing, a spring suspended from the front axle, means for pivotally mounting the motor casing on said spring and on the frame of the tractor, a gear loosely mounted in the above mentioned gear casing and threaded on the aforesaid threaded rod, manually controlled means for rotating said gear to adjust the position of the motor casing and motor relative to the threaded rod for shifting the center of gravity of the frame of the machine, and a tractor having a single driving wheel, said driving wheel having pivoted threaded sections capable of free lateral movement.

RODERICK MacEACHEN.